United States Patent

[11] 3,591,009

| [72] | Inventors | Oscar Luthi<br>51 Browning Ave., Nashua, N.H. 03060;<br>James P. Ross, 24 Coles Grove, Derry, N.H. 03038 |
|---|---|---|
| [21] | Appl. No. | 852,424 |
| [22] | Filed | Aug. 22, 1969 |
| [45] | Patented | July 6, 1971 |

[54] DISC FILTER HAVING FILTRATE DIRECTING MEANS
8 Claims, 6 Drawing Figs.

[52] U.S. Cl. .......................................... 210/247, 210/331
[51] Int. Cl. .................................... B01d 33/38, B01d 33/26
[50] Field of Search .................................. 210/247, 331, 456

[56] References Cited
UNITED STATES PATENTS
2,207,618  7/1940  Grill et al. ...................... 210/331 X Primary Examiner—Frank A. Spear, Jr.
Attorneys—Carl R. Horten, David W. Tibbott and Robert R. Paquin ABSTRACT: A disc filter wherein baffles are mounted on the core adjacent the connections of the filter disc passages to the core drainage passages, such baffles controlling the communication of the filter disc passages with the core outlet means and defining flow openings to equalize filtrate flow through each filter disc. The flow openings are located whereby filtrate discharged to the core passages from the filter disc passages flows in a direction towards the core outlet means.

INVENTORS
OSCAR LUTHI
JAMES P. ROSS
BY
Robert K. Caspin
ATTORNEY

INVENTORS
OSCAR LUTHI
JAMES P. ROSS
BY
*Robert L. Paquin*
ATTORNEY

DISC FILTER HAVING FILTRATE DIRECTING MEANS

BACKGROUND OF THE INVENTION

The present invention relates to filtering apparatus and has more particular reference to disc filters for filtering a slurry such as, for example, pulp stock for the manufacture of paper.

Conventional filters of the type to which this invention is directed normally include a rotatable hub or core carrying a plurality of filter discs and provided with longitudinally extending core passages which may taper from outlet or discharge means at one end of the core. During the operation of such a filter, the core is rotatably driven to locate successive arcuate portions of the filter discs below the level of the slurry; and a subatmospheric pressure or vacuum is applied whereby filtrate is induced to flow through the core passages and filter screens overlaying the disc side faces to facilitate filtered stock accumulation on the filter screens.

It has been discovered that, particularly during relatively high filtrate flow, the subatmospheric pressure or vacuum provided in the ends of the core passages remote from the outlets is substantially lower than that in the ends thereof adjacent the outlets. This differential in subatmospheric pressure or vacuum drop is believed to be primarily due to the forces necessary for accelerating the filtrate from its near-static condition at the remote ends of the core passages to its terminal velocity at the other ends of such passages. This differential in subatmospheric pressure has been found to cause the filter discs mounted adjacent the remote ends of the core passages to accumulate only a relatively thin (and even in some instances substantially nonexistent) fiber mat, although adjacent the other ends of the core passages the filter discs may carry a normal thicker fiber mat. This differential in fiber mat on the filter discs is detrimental to the filter operation as the relatively thin mat on the first-mentioned filter discs provides insufficient restriction to the entrance of air into the core passages and such air further reduces the filter operating vacuum.

SUMMARY OF THE INVENTION

An object of the present invention is to provide a new and improved disc filter which is particularly constructed and arranged to permit control of the subatmospheric pressure or vacuum applied to the filter discs whereby such subatmospheric pressure may be substantially equalized for the filter discs substantially regardless of their position along the core passages.

Another object of the invention is to provide a new and improved disc filter which is particularly constructed and arranged to permit control of the velocity and direction of the flow of the filtrate discharged by the filter discs to the core passages.

Other objects of the invention are to provide a new and improved disc filter which is particularly constructed and arranged to maintain a high velocity of the filtrate in the core passages for maximum cloudy-clear filtrate separation while minimizing pressure drop due to the high velocity, and to maintain maximum filter efficiency over a wide range of operating conditions.

In general, a disc filter constructed in accordance with the present invention may comprise a rotatable core provided with longitudinally extending core passage means and core outlet means for discharging filtrate from the core passage means, filter disc means mounted on the core, such filter disc means having a plurality of disc passages connected to the core passage means and arranged to communicate through the core passage means with the core outlet means, and means adjacent the connections of the disc passages to the core passage means for controlling the communication of the disc passages with the core outlet means and directing filtrate discharged to the core passage means by the disc passages in a direction towards the core outlet means.

BRIEF DESCRIPTION OF THE DRAWINGS

Referring to the drawings.

DESCRIPTION OF THE PREFERRED EMBODIMENT

Figure 1:
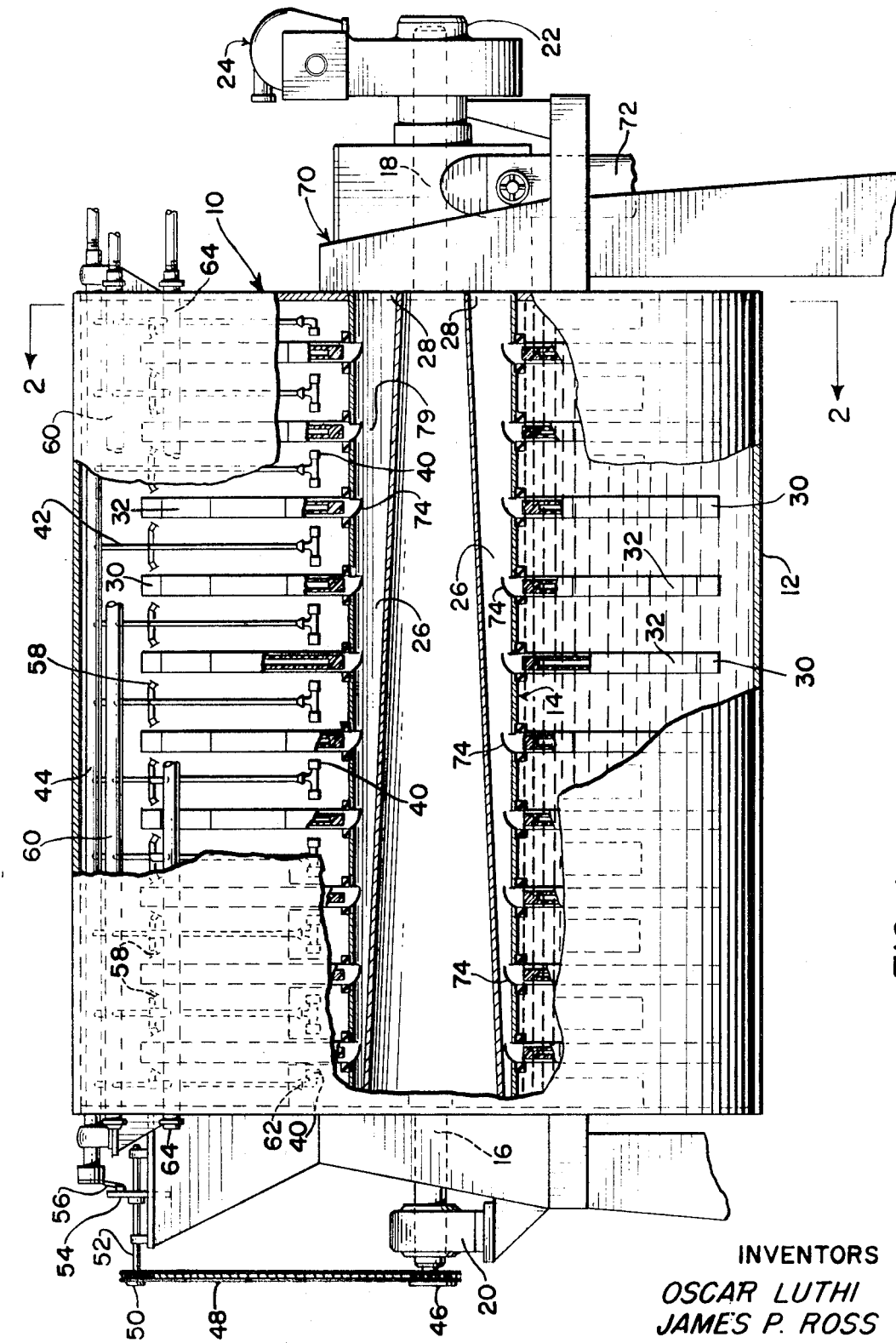
FIG. 1 is an elevational view, partially broken away and in section, of a disc filter constructed in accordance with one embodiment of the invention.

Referring more particularly to the drawings wherein similar reference characters designate corresponding parts throughout the several views, FIG. 1 illustrates a disc filter designated generally as 10 which, generally considered, is of the type disclosed in U.S. Pat. No. 3,193,105, issued July 6, 1965 to Neil F. Putnam and assigned to the assignee of the present invention. The disc filter 10 is provided with a vat or tank 12 which during the operation of the filter 10 contains the slurry to be filtered, for example pulp stock for the manufacture of paper. This slurry is supplied to the vat 12 at a controlled rate through a slurry inlet (not shown) on the near side of the vat 12, as viewed in FIG. 1.

Figure 2:
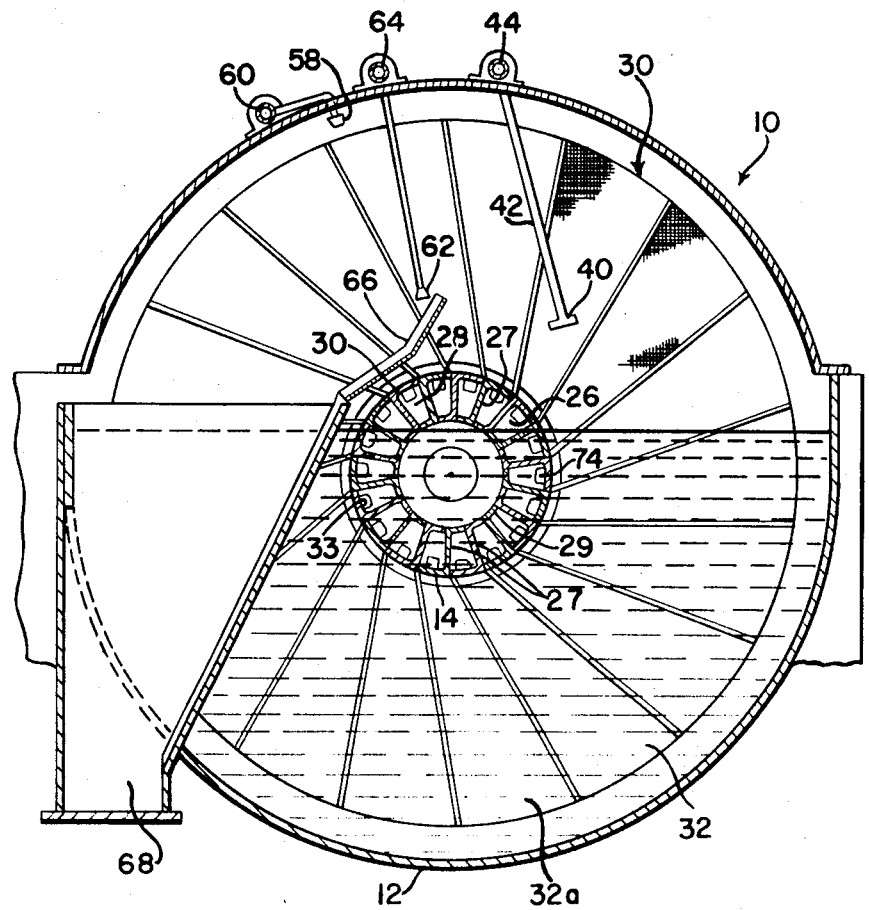
FIG. 2 is an elevational sectional view of such disc filter taken on line 2–2 of FIG. 1, looking in the direction of the arrows.
Figure 3:
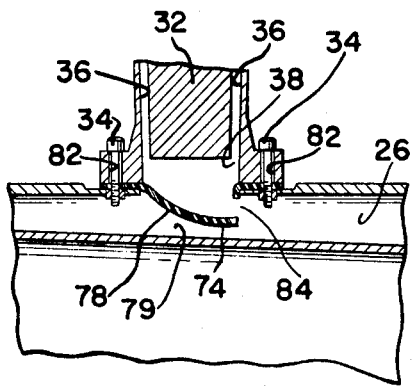
FIG. 3 is an enlarged fragmentary elevational sectional view of the disc filter shown in FIGS. 1 and 2.
Figure 4:
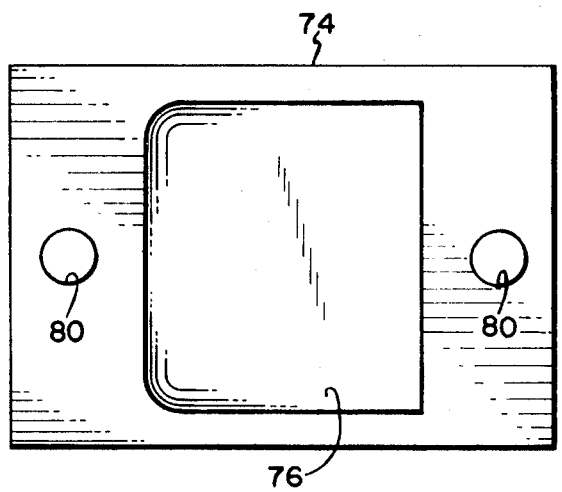
FIG. 4 is an enlarged plan view illustrating a baffle of the filter.
Figure 6:
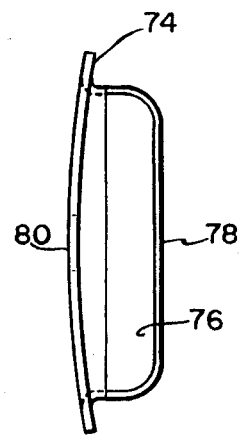
FIGS. 5 and 6 are side and end views, respectively, of such baffle.
Figure 5:
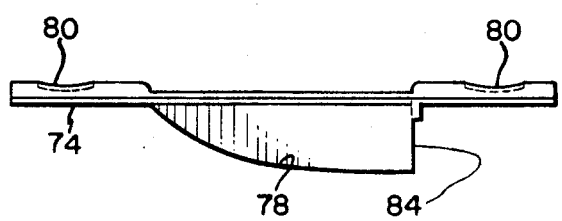

The disc filter 10 comprises a generally horizontal core or core assembly 14 which is rotatably mounted by stub shafts 16, 18 connected to the opposing ends of the core 14 and rotatably supported by bearings located in bearing housings 20, 22, respectively. The core 14, during operation of the filter 10, is continuously rotatably driven in the clockwise direction (as viewed in FIG. 2) by a drive motor designated generally at 24 which is gear connected to the stub shaft 18. The core 14 contains the conventional core passage means including a plurality of generally side-by-side longitudinally extending core drainage passages or channels 26 which cooperate to form an annular volume around the periphery of the core 14 throughout the length of the latter. The core drainage passages 26 are closed at the end of the core 14 most adjacent to the stub shaft 16, separated one from another by separating walls 27, and bounded along their inner and outer peripheries by inner and outer walls 29, 33, respectively. The core drainage passages 26 are provided with individual outlets 28 at the end of the core 14 most adjacent to the stub shaft 18 and, during the operation of the filter 10, the usual subatmospheric pressure is applied through such outlets 28 and filtrate is drained from the core 14 therethrough. The core drainage passages 26 each taper in cross section as they extend longitudinally from their communicating outlet 28.

A plurality of annular filter discs, each designated generally as 30, are fixedly mounted to the outer periphery of the core 14 at locations spaced along the length of the latter and partially submerged in the slurry in the vat 12. Each of the filter discs 30 in the conventional manner is formed from a plurality of generally side-by-side filter sectors or sections 32. The filter sections 32 are illustrated as being of the type described in the aforementioned U.S. Pat. No. 3,193,105, but may be of the type disclosed in U.S. Pat. No. 3,438,505, issued Apr. 15, 1969 to O. Luthi, or alternatively the filter discs 30 may be of any other suitable construction. The filter sections 32 are mounted at their opposing sides to the core 14 by mounting bolts 34 and are provided on their side faces with the usual filter screen wire 32a. Each filter section 32, as illustrated, inwardly of each screen wire 32a includes drainage passages 36 which merge adjacent the base of the filter section 32 into a common or single drainage passage 38 open at its inner end (i.e.: the end most adjacent to the core 14). The drainage passages 38 of the filter sections 32 each are connected to a respective core passage 26 and communicate through the core passages 26 with the core outlets 28; and the filter discs 30 are mounted on the core 14 to cause each filter disc 30 to have a filter section 32 communicating with each one of the core passages 26.

Adjacent to the side faces of the filter discs 30, there are provided shower nozzles 40 arranged to discharge water or other suitable screen cleaning liquid onto the screens 32a of the filter sections 32 above the level of the slurry in the vat 12. The shower nozzles 40 are all suspended by supply pipes 42 from a rotatable shower water supply manifold 44 which, in turn, is connected at one end to receive the cleaning liquid from a source thereof (not shown). A sprocket 46, mounted on the stub shaft 16, is connected by a drive chain 48 to a sprocket 50 on a driven shaft 52 which carries a cam 54. The cam 54 during the rotation of the driven shaft 52 cooperates with a cam follower 56, mounted on one end of the supply manifold 44, such that the core 14 acts through the drive chain 48, driven shaft 52, cam 54 and cam follower 56 to drive the supplied manifold 44 whereby the nozzles 40 are agitated to apply the liquid to all portions of the filter screens 32a rotating thereby.

In addition, a stationary shower nozzle 58 is located adjacent each of the side faces of the filter discs 30 to direct water or other suitable liquid onto the filter screens 32a adjacent the outer peripheries thereof. The shower nozzles 58 are all connected to receive the water from a single or common supply manifold 60, in turn, connected at one end to a source (not shown) of such water. Also, another stationary shower nozzle 62 is arranged to discharge water or other suitable liquid onto the filter screens 32a below the water supplied by the nozzles 58, such nozzles 62 being connected to a single or common supply manifold 64 to receive water discharged thereto from a source (not shown) thereof. Thus, in the conventional manner the water supplied by the nozzles 58 peels the filtered stock or fiber mat from the filter screens 32a; and the water supplied through the nozzles 62 assists in moving the peeled-off filter cake through discharge chutes 66 to filtered stock outlets 68.

A valving assembly designated generally as 70 is located adjacent the core outlets 28 for applying subatmospheric pressure or vacuum through such outlets 28 to the core passages 26 when the therewith communicating filter sections 32 are submerged in the slurry in the vat 12, whereby such subatmospheric pressure induces filtrate flow through the filter screens 32a and core passages 26 to facilitate filtered stock accumulation on the filter screens 32a. The subatmospheric pressure is created by, and filtrate discharged through the core outlets 28 and valving assembly 70 is drained to, a pair of barometric legs 72 located one behind the other in FIG. 1. The valving assembly 70 also connects the core outlets 28 to normal atmospheric pressure for facilitating the peeling off of accumulated filtered stock when the filter sections 32 are above the level of the slurry in the vat 12 and momentarily shuts off the core outlets 28 from both subatmospheric pressure and atmospheric pressure intermediate their connections thereto. The valving assembly 70, per se, is of conventional construction and hence will not be further described in detail.

In the general operation of the disc filter 10, slurry to be filtered is continuously supplied to the vat 12 to maintain the level of the slurry in the vat 12 at a predetermined desired level wherein the filter discs 30 are only partially submerged. The core 14 and its carried filter discs 30 are continuously rotatably driven in the clockwise direction (as viewed in FIG. 2) to cause the filter sections 32 to be successively immersed in the slurry whereupon the valving assembly 70 communicates the immersed filter sections 32 with the barometric legs 72 through their respective core passages 26 and core outlets 28. Thus, the subatmospheric pressure is applied through such core passages 26 and filtrate is drained from the filter section passages 36, 38, while filtered stock is progressively accumulated on the filter screens 32a. As the rotation of the core 14 and filter discs 30 continues, the filter sections 32 are upwardly moved out of the slurry whereupon the application of subatmospheric pressure through the valving assembly 70, core outlets 28 and core passages 26 is momentarily shut off. Then the core passages 26 are connected to the aforementioned atmospheric pressure whereupon the collected stock is rotated to the liquid streams emitted by the nozzles 58, 62 which remove such stock from the filter sections 32. Continued rotation of the core 14 and filter discs 30 drives the filter sections 32, now free of collected stock, past the nozzles 40 which direct liquid on the filter screens 32a for their cleaning.

In accordance with the present invention, the filter 10 is provided with means adjacent the connections of the disc passages 38 to the core passages 26 for controlling the communication of the disc passages 38 with the core outlets 28 and directing the filtrate discharged to the core passages 26 from the disc passages 38 in a direction towards the core outlets 28. This controlling and directing means comprises individual baffles 74 for each of the filter section 32, such baffles 74 each being located in the core passage 26 communicating with the disc passage 38 of the respective filter section 32 generally transversely across the inner open end of the drainage passage 38 of such filter section 32.

The baffles 74 are all of identical construction and arrangement for each disc filter and, hence, only a single baffle 74 has been shown enlarged in FIGS. 3 through 6 for the purpose of illustration. As will be seen from FIGS. 3 through 6, each baffle 74 is constructed in the form of a plate having a generally centrally located recess 76 bounded by a louverlike tongue portion 78 which is spaced from the core passage inner wall 29 by a flow space 79; and the baffle 74 is mounted such that the recess 76 faces or directly opposes the drainage passage 38 of the respective filter section 32. The baffles 74 each include mounting openings 80 at opposing sides, such openings 80 being located to be aligned with the mounting openings 82 in their respective filter section 32. The baffles 74 are each mounted to the core 14 by the same mounting bolts 34 which extend through the openings 82 to secure the corresponding filter section 32 to the core 14.

The baffles 74 each define a flow opening 84 communicating with the drainage passage 38 of the respective filter section 32 through the recess 76 and also communicating with the corresponding core outlet 28. Thus, the recesses 76 serve as relatively shallow flow cavities at the inner open ends of the disc passages 38, and, as the sole communication of the disc passages 38 with the core outlets 28 is through such cavities, tend to substantially equalize the subatmospheric pressure or vacuum applied to the filter sections 32 during the aforedescribed rotation of the filter discs 30. The flow openings 84 are each arranged adjacent the side of the corresponding filter section 32 most adjacent to the respective core outlet 28 and are thereby located to cause filtrate discharged by the communicating drainage passage 38 to flow in a direction in the core passage 26 directly towards the communicating core outlet 28. The flow openings 84 for each of the baffles 74 are formed of a substantially identical flow area; this flow area is, of course, variable for different embodiments of the invention and largely dependent on variables such as the particular taper of the core passages 26 and the number and diameter of the filter sections 32.

In the aforedescribed operation of the disc filter 10, during the application of the subatmospheric pressure or vacuum in the core passages 26 and the drainage of filtrate from the filter sections 32 through the core passages 26, the baffles 74 define the aforementioned relatively shallow bottomed cavities through which the drainage passages 38 communicate with the outlets 28 and cause substantially equal application of the subatmospheric pressure to the sections 32 by accelerating (i.e., increasing the velocity and changing the direction of flow of) the filtrate discharged from the filter sections 32 to the core passages 26. Thus, high velocity of the filtrate in the core passages 26 is facilitated for maximum cloudy-clear filtrate separation while pressure drop due to the high velocity is substantially eliminated. Also, the baffles 74 direct filtrate discharged to the core passages 26 from the drainage passages 38 towards the core outlets 28.

From the aforegoing it will be seen that the invention provides new and improved means for accomplishing all of the aforementioned objects and advantages. It will be understood, however, that, although only a single embodiment of the invention has been illustrated and hereinbefore specifically described, the invention is not limited merely to this single embodiment but rather contemplates other embodiments and variations.

We claim:

1. A disc filter comprising a rotatable core provided with longitudinally extending core passage means and core outlet means for discharging filtrate from said core passage means, filter disc means having a plurality of disc passages connected to said core passage means and arranged to communicate through said core passage means with said core outlet means, and means adjacent the connections of said disc passages to said core passage means for controlling the communication of said disc passages with said core outlet means and directing filtrate discharged to said core passage means from said disc passages in a direction towards said core outlet means, said controlling and directing means comprising baffle means in said core passage means extending generally transversely to said disc passages, said baffle means defining flow openings through which said disc passages communicate with said core outlet means, and said flow openings being located to cause filtrate discharged by said disc passages to flow in said direction towards said core outlet means.

2. A disc filter according to claim 1, wherein said filter disc means includes a plurality of filter discs spaced longitudinally of said core, said filter discs each comprising a plurality of filter sections generally side-by-side and including said disc passages, said baffle means comprises separate baffles for each of said filter sections, and said flow openings are adjacent the side of their respective filter section most adjacent to said core outlet means.

3. A disc filter comprising a rotatable core provided with longitudinally extending core drainage passage means and core outlet means at one end of said core through which filtrate is discharged from said core passage means, a plurality of filter discs each adapted to encircle said core and including generally side-by-side filter sections having open-ended drainage passages for discharging filtrate from the filter discs, means mounting said filter discs around said core at locations spaced along the length of said core with the open ends of said disc drainage passages connected to said core passage means and arranged to communicate through said core passage means with said outlet means, and baffle means adjacent the open ends of said disc drainage passages for controlling the communication of such open ends with said outlet means and directing filtrate discharged to said core passage means through such open ends in a direction towards said one end of said core, said baffle means extending generally transversely to their respective open ends and defining flow openings through which such open ends communicate with said core outlet means, said flow openings being located to cause the filtrate discharged through the open ends to flow in said direction towards said one end of said core.

4. A disc filter according to claim 3, wherein said mounting means also mount said baffle means to said core.

5. A disc filter according to claim 3, wherein said baffle means provide relatively shallow cavities at said open ends and said flow openings are each of substantially the same flow area and communicate with said open ends through said cavities.

6. A disc filter comprising a rotatable core provided with a plurality of longitudinally extending core drainage passages and core outlet means at one end of said core for discharging filtrate from said core passages, said core passages tapering in cross section from said one end of said core, a plurality of filter discs each adapted to encircle said core and including generally side-by-side filter sections, the filter sections of each of said filter discs being provided with open-ended drainage passages for draining filtrate from said filter discs, means mounting said filter discs around said core at locations spaced along the length of said core whereby the open ends of such disc drainage passages are connected to respective core drainage passages and arranged to communicate through such core passages with said core outlet means, and a baffle in said core passages adjacent the open end of each of said disc drainage passages of said filter sections, said baffles being mounted to said core by said mounting means, said baffles extending generally transversely across their adjacent open ends to control the communication of such open ends with said core outlet means and defining flow openings located to cause filtrate discharged to said core passages through said open ends to flow in a direction towards said core outlet means.

7. A disc filter according to claim 6, wherein said baffles include recessed portions having their recesses facing said open ends to provide relatively shallow cavities at said open ends, and said flow openings are each of substantially the same flow area and communicate with said open ends through said recesses.

8. A disc filter according to claim 6, wherein said mounting means for each of said filter sections include a plurality of mounting bolts securing opposite sides of said filter sections to said core, said baffles each include a baffle plate mounted at opposite ends to said core by said mounting bolts, and said baffle plates have said flow openings therethrough.